United States Patent
Yoo et al.

(10) Patent No.: US 10,644,316 B2
(45) Date of Patent: May 5, 2020

(54) ANODE SLURRY FOR SECONDARY BATTERY FOR IMPROVING DISPERSIBILITY AND REDUCING RESISTANCE, AND ANODE COMPRISING SAME

(71) Applicant: LG CHEM, LTD., Seoul (KR)

(72) Inventors: Jung Woo Yoo, Daejeon (KR); Hyung Suk Cho, Daejeon (KR); Ye Cheol Rho, Daejeon (KR); Kyung Hwa Woo, Daejeon (KR); Kwang Ho Jeong, Daejeon (KR); Je Young Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/569,633

(22) PCT Filed: Oct. 19, 2016

(86) PCT No.: PCT/KR2016/011767
§ 371 (c)(1),
(2) Date: Oct. 26, 2017

(87) PCT Pub. No.: WO2017/082546
PCT Pub. Date: May 18, 2017

(65) Prior Publication Data
US 2018/0358622 A1 Dec. 13, 2018

(30) Foreign Application Priority Data
Nov. 11, 2015 (KR) .................. 10-2015-0158423

(51) Int. Cl.
*H01M 4/62* (2006.01)
*H01M 4/133* (2010.01)
*H01M 10/052* (2010.01)
*H01M 4/13* (2010.01)
H01M 4/587 (2010.01)
H01M 4/1393 (2010.01)
H01M 4/02 (2006.01)

(52) U.S. Cl.
CPC .............. *H01M 4/62* (2013.01); *H01M 4/13* (2013.01); *H01M 10/052* (2013.01); *H01M 4/133* (2013.01); *H01M 4/1393* (2013.01); H01M 4/587 (2013.01); H01M 4/622 (2013.01); H01M 4/625 (2013.01); H01M 2004/027 (2013.01); Y02T 10/7011 (2013.01)

(58) Field of Classification Search
None
See application file for complete search history.

(56) References Cited

U.S. PATENT DOCUMENTS

| | | | |
|---|---|---|---|
| 8,920,977 B2 | 12/2014 | Kameda et al. | |
| 9,711,794 B2 | 7/2017 | Koo et al. | |
| 9,853,289 B2 | 12/2017 | Ahn et al. | |
| 2012/0052393 A1* | 3/2012 | Kameda .............. | H01M 4/133 429/231.8 |
| 2012/0231337 A1 | 9/2012 | Miyata et al. | |
| 2012/0244431 A1 | 9/2012 | Tani et al. | |
| 2013/0202781 A1 | 8/2013 | Kobayashi | |
| 2014/0212750 A1 | 7/2014 | Ahn et al. | |
| 2015/0030923 A1 | 1/2015 | Koo et al. | |
| 2015/0255793 A1 | 9/2015 | Wakizaka et al. | |
| 2015/0303456 A1 | 10/2015 | Yoo et al. | |
| 2016/0359169 A1 | 12/2016 | Miyata et al. | |
| 2018/0226649 A1 | 8/2018 | Wakizaka et al. | |

FOREIGN PATENT DOCUMENTS

| | | | | |
|---|---|---|---|---|
| CN | 101931074 A | 12/2010 | | |
| CN | 102362381 A | 2/2012 | | |
| CN | 103843179 A | 6/2014 | | |
| CN | 104081568 A | 10/2014 | | |
| JP | 2009-99441 A | 5/2009 | | |
| JP | 2009099441 A | * | 5/2009 | |
| JP | 2012-199198 A | 10/2012 | | |
| JP | 2013-008526 A | 1/2013 | | |
| JP | 2013-089422 A | 5/2013 | | |
| JP | 2013-257978 A | 12/2013 | | |
| KR | 10-2013-0064943 A | 6/2013 | | |
| KR | 10-2014-0140980 A | 12/2014 | | |
| KR | 10-2015-0035475 A | 4/2015 | | |
| KR | 10-2015-0039826 A | 4/2015 | | |
| KR | 10-2015-0071453 A | 6/2015 | | |
| KR | 10-2015-0120795 A | 10/2015 | | |
| WO | WO 2012/046305 A1 | 4/2012 | | |
| WO | WO-2013122352 A1 * | 8/2013 | .......... | C09J 101/286 |
| WO | WO 2015/064465 A1 | 5/2015 | | |

OTHER PUBLICATIONS

Machine translation of Shindo et al. JP-2009099441-A (Year: 2009).*
International Search Report for PCT/KR2016/011767 dated Jan. 11, 2017.
European Search Report for Appl. No. 16864472.2 dated Jun. 8, 2018.

* cited by examiner

*Primary Examiner* — Wojciech Haske
(74) *Attorney, Agent, or Firm* — Birch, Stewart, Kolasch & Birch, LLP

(57) ABSTRACT

The present invention provides an anode slurry for a secondary battery and an anode comprising the same, in which the dispersibility of an anode active material is improved by increasing the adsorption amount of CMC with respect to the anode active material by adjusting the degree of substitution or physical properties such as molecular weight, and a CMC blend amount is reduced so as to increase the slurry solid content and reduce the resistance of a battery.

6 Claims, No Drawings

ANODE SLURRY FOR SECONDARY BATTERY FOR IMPROVING DISPERSIBILITY AND REDUCING RESISTANCE, AND ANODE COMPRISING SAME

CROSS-REFERENCE TO RELATED APPLICATION

This application claims priority to and the benefit of Korean Patent Application No. 10-2015-0158423, filed on Nov. 11, 2015, the disclosure of which is incorporated herein by reference in its entirety.

TECHNICAL FIELD

The present invention relates to an anode slurry for a secondary battery capable of improving dispersibility of the anode active material and simultaneously reducing resistance of a battery by adjusting physical properties such as a degree of substitution and a molecular weight of carboxymethyl cellulose (CMC).

BACKGROUND ART

In recent years, there has been a dramatic increase in demand for batteries as energy sources with the technical development and increase in demand for mobile devices. As vehicles such as hybrid electric vehicles (HEV), plug-in hybrid electric vehicles (PHEV), and electric vehicles (EV) have come into the spotlight as vehicles of the future, research on batteries capable of meeting various requirements has been conducted accordingly. In particular, research on a lithium secondary battery having a high energy density and also exhibiting excellent lifespan and cycle characteristics as a power source for such devices has been actively conducted.

A lithium secondary battery refers to a battery in which a non-aqueous electrolyte containing lithium ions is included in an electrode assembly that includes a cathode including a cathode active material enabling intercalation/deintercalation of lithium ions, an anode including an anode active material enabling intercalation/deintercalation of lithium ions, and a microporous separator interposed between the cathode and the anode.

The most important challenge in preparing anode slurry for preparing the anode is to increase dispersibility of the anode active material. A thickening agent serving as a dispersing agent is added to achieve sufficient dispersibility. In this case, when the thickening agent is added in a very small amount, the anode active material may not be sufficiently dispersed in the anode slurry, and thus large aggregates may be formed or slurry precipitation may occur. As a result, when a current collector is coated with the slurry, problems regarding filter plugging, surface defects of electrodes, and the like may occur. On the other hand, when the thickening agent is added in a very large amount, migration of lithium ions in the anode may be prevented, resulting in increased resistance of the anode. Therefore, the most important challenge is to minimize an amount of the thickening agent in order to maintain sufficient dispersibility and simultaneously reduce the resistance of the anode.

Accordingly, the present inventors have conducted research on carboxymethyl cellulose (CMC) as a thickening agent, found that an adsorption amount of CMC adsorbed onto an anode active material varies depending on physical properties of CMC, such as a degree of substitution or a molecular weight, compared changes in viscosity and precipitation of CMC while changing the physical properties and a blend amount of CMC, and finally prepared anode slurry having a reduced blend amount of CMC and simultaneously exhibiting excellent dispersibility, and a secondary battery having reduced resistance as well.

DISCLOSURE

Technical Problem

Therefore, the present invention is designed to solve the problems of the prior art, and it is an object of the present invention to provide an anode slurry for a secondary battery capable of regulating physical properties of carboxymethyl cellulose (CMC), such as a degree of substitution and a molecular weight, to increase an adsorption amount of CMC with respect to the anode active material, thereby improving dispersibility of an anode active material and reducing a blend amount of CMC to increase a solid content of slurry and reduce resistance of a battery, and an anode including the same.

Technical Solution

To solve the above problems, according to an aspect of the present invention, there is provided an anode slurry for a secondary battery which includes an anode active material and a thickening agent, wherein the anode active material has a tap density of 1.0 g/cc or less and a slurry solid content of 48% by weight or more based on the total weight of the slurry.

According to another aspect of the present invention, there is provided an anode for a secondary battery including the anode slurry for a secondary battery, a lithium secondary battery including the anode for a secondary battery, and a battery module and a battery pack including the same.

Advantageous Effects

The anode slurry for a secondary battery according to the present invention can be useful in increasing an adsorption amount of carboxymethyl cellulose (CMC) with respect to the anode active material to improve dispersibility of an anode active material and reduce a blend amount of CMC to increase a solid content of slurry and reduce resistance of a battery as well.

BEST MODE

Hereinafter, the present invention will be described in further detail to aid in understanding the present invention. In this case, the terms and/or words used in this specification and the appended claims are not to be interpreted as limited to commonly used meanings or meanings in dictionaries and should be interpreted with meanings and concepts which are consistent with the technological scope of the present invention based on the principle that the present inventors have appropriately defined concepts of terms to describe the present invention in the best way.

The present invention provides an anode slurry for a secondary battery including an anode active material and a thickening agent, wherein the anode active material has a tap density of 1.0 g/cc or less and a slurry solid content of 48% by weight or more based on the total weight of the slurry.

The thickening agent according to one exemplary embodiment of the present invention may be a cellulose-based polymer which includes one or more selected from the group consisting of carboxymethyl cellulose (CMC), methyl cellulose (MC), hydroxypropyl cellulose (HPC), methyl hydroxypropyl cellulose (MHPC), ethyl hydroxyethyl cellulose (EHEC), methyl ethyl hydroxyethyl cellulose (MEHEC), and cellulose gum. Specifically, the thickening agent may be CMC.

The CMC imparts a high thickening property and an excellent coating property while contributing to an adhesive strength of a current collector to prevent an active material from being detached from the current collector, and also exhibits excellent cycle characteristics.

More specifically, the anode active material according to one exemplary embodiment of the present invention may have a tap density of 1.0 g/cc or less.

The tap density refers to a mass of a powder consisting of particles per unit volume, that is a density of the powder with which pores between particles is uniformly filled after being tapped or vibrated. Factors having an influence on the tap density may include particle size distribution, moisture content, particle shape, cohesiveness, and the like. Fluidity and compressibility of a material may be predicted through the tap density. The tap density may be measured based on ASTM D4781, and may be calculated using the equation of TD=W/V (TD: tap density, W: weight (g) of sample, and V: volume of sample after tapping).

When the tap density of the anode active material is less than or equal to 1.0 g/cc, a degree of sphericity of the anode active material may be lowered, and the anode active material may not be easily dispersed, which makes it necessary to require a large blend amount of CMC. In this case, the higher the blend amount of CMC is, the lower a slurry solid content is. Here, the slurry solid content refers to a weight ratio of a solid component in slurry with respect to the total weight of the slurry. In this case, the slurry solid content is calculated based on the blend amount of each of the components actually used, (Weight of solid component)/(Weight of solid component+Weight of liquid component), and measured using a method of measuring a weight of slurry remaining after the final slurry is dried in an oven to completely remove moisture.

In the equation, the solid components may refer to an active material, a conductive material, a CMC thickening agent and an SBR binder, which are actually added in predetermined amounts, and the liquid component may refer to water included in CMC and an SBR solution and water that may be additionally added to regulate viscosity. The higher the slurry solid content is, the higher the capacity of the battery is. Also, because hot air may be reduced and a time may be shortened during drying, productivity may be excellent.

Therefore, as in the anode slurry for a secondary battery according to the present invention, it is a more difficult challenge for an anode active material having a tap density of 1.0 g/cc or less to have a slurry solid content of 48% by weight, compared to an anode active material having a tap density of 1.0 g/cc or more.

The present invention is designed to solve the above problems, and thus the anode slurry for a secondary battery includes CMC which may exhibit excellent dispersibility of the anode active material and simultaneously reduce resistance of the battery by regulating physical properties of CMC, such as a degree of substitution or a molecular weight, to adjust an adsorption amount of CMC with respect to the anode active material. Therefore, even when the anode active material having a tap density of 1.0 g/cc or less is used, the anode active material may have a slurry solid content of 48% by weight or more.

Specifically, the carboxymethyl cellulose (CMC) according to one exemplary embodiment of the present invention may have an adsorption amount (hereinafter referred to as 'CMC adsorption amount') of 0.8% by weight or more, preferably 0.8 to 0.9% by weight with respect to the anode active material.

The CMC adsorption amount may be measured using the following method. CMC is mixed at a ratio of 1.5% by weight or more with respect to a given active material to prepare active material-CMC slurry. The slurry is diluted 5-fold with distilled water and filtered using a suction flask to remove distilled water and CMC adsorbed onto the active material. The residual slurry remaining after the filtration is dried, and a decrease in weight of the slurry is determined under a nitrogen atmosphere using a thermogravimetric analyzer (TGA) while the slurry is heated from room temperature to a temperature of 500° C. or higher. Because the weight of the active material is not changed and a decrease in weight of CMC at a predetermined temperature is known, a weight ratio of CMC adsorbed with respect to the active material (weight of CMC adsorbed/sum of weights of active material and CMC) may be measured. As another method, there is a method of determining a ratio of CMC remaining in the residual slurry after the filtration using a trace element analyzer.

When the CMC adsorption amount is less than 0.8% by weight, particles of the anode active material may form an aggregate due to insufficient dispersibility, which makes it impossible to perform smooth coating. In this case, the anode active material has poor performance as an electrode, which makes it impossible to realize sufficient battery performance. When a blend amount of CMC is increased to maintain dispersibility, it is difficult to achieve a goal of preparing an anode slurry having a solid concentration of 48% by weight or more, and drying after coating is difficult as the solid content of slurry decreases. As a result, because it is difficult to uniformly form an electrode, another problem regarding degraded performance of the battery may be caused. When the CMC adsorption amount is greater than 0.9% by weight, an excessive amount of CMC may be adsorbed onto a surface of the anode active material, thereby interrupting migration of lithium ions and resulting in increased internal resistance of the battery.

Because the anode slurry for a secondary battery according to one exemplary embodiment of the present invention includes CMC whose adsorption amount with respect to the anode active material falls within this range, a sufficient amount of hydrophilic CMC is adsorbed onto a particle surface of the hydrophobic anode active material so that the individual particles of the anode active material do not easily form an aggregate, resulting in a good state of dispersion. Therefore, a slurry solid content of 48% by weight or more may be achieved due to a low blend amount of CMC, and an anode having excellent dispersibility and low resistance may be prepared as well.

Meanwhile, the CMC adsorption amount may be realized by regulating the physical properties of CMC, such as a degree of substitution and a molecular weight.

For this purpose, CMC having a degree of substitution (DS) of 0.7 to 1.3, more preferably 0.7 to 0.9, may be used as the carboxymethyl cellulose (CMC) according to one exemplary embodiment of the present invention.

The degree of substitution is also referred to as a 'degree of etherification,' and refers to the number (average) of hydroxyl groups substituted with carboxymethyl groups among three hydroxyl groups (OH groups) present in each glucose ring constituting cellulose, and a value thereof may be theoretically in a range of 0 to 3. Generally, the higher the degree of substitution is, the more hydrophilic the CMC is. As a result, the CMC has a characteristic of being easily dissolved.

When the degree of substitution is less than 0.7, a large amount of a non-dissolved substance referred to as a microgel remains because CMC is not completely dissolved when CMC is dissolved in distilled water due to low water solubility. This causes additional aggregation during preparation of slurry and surface defects of the electrode after coating. When the degree of substitution is greater than 0.9, solubility may be improved due to high hydrophilicity, but the CMC adsorption amount may be reduced due to a low affinity to the active material.

CMC having a molecular weight of 700,000 to 4,200,000, more preferably 700,000 to 3,500,000, may be used as the carboxymethyl cellulose (CMC) according to one exemplary embodiment of the present invention.

In this specification, the molecular weight of CMC refers to a weight average molecular weight (Mw) of CMC, as measured by gel permeation chromatography (GPC) and a differential refractive index (RI) detector.

When the molecular weight is less than 700,000, the anode active material may not be uniformly dispersed due to a decrease in attraction between polymers forming a network when the network is formed using the thickening agent, and a decline in adhesive strength of the active material may have a negative influence on battery lifespan characteristics. On the other hand, when the molecular weight is greater than 3,500,000, an increase in viscosity of the slurry to an extent wherein coating of the slurry is difficult may occur due to very high viscosity even when CMC is used at the same concentration. However, when distilled water is additionally added to reduce the viscosity of the slurry to prevent such an increase in viscosity of the slurry, a solid content of the slurry may be reduced, thereby causing another problem regarding lowered productivity of the electrode.

For this reason, in the present invention, the CMC includes low molecular weight CMC having a molecular weight of 1,000,000 or less and high molecular weight CMC having a molecular weight of 2,000,000 or more, wherein the low molecular weight CMC and the high molecular weight CMC are blended at a weight ratio between 1:3 and 3:1. In this case, the CMC satisfying a weight average molecular weight range according to the present invention may be used by adjusting the blending ratio.

The carboxymethyl cellulose (CMC) according to one exemplary embodiment of the present invention may be included at a content of 1% by weight or less based on the total weight of the anode slurry.

Generally, when the blend amount of CMC is reduced, particles of the anode active material may form large aggregates because the anode active material is not sufficiently dispersed. In this case, a filter may be blocked by the aggregates during coating of a current collector. Also, because a sufficient amount of an electrolyte does not reach inner parts of the large aggregates, migration of lithium ions may be difficult, resulting in a reduced capacity of the battery.

On the other hand, when the blend amount of CMC increases too much, migration of lithium ions may be interrupted due to an excessive amount of CMC adsorbed onto surfaces of the particles of the anode active material, resulting in increased internal resistance of the battery.

The present invention provides anode slurry for a secondary battery capable of reducing internal resistance of the battery and having excellent dispersibility because a blend amount of CMC may be minimized by adjusting the blend amount of CMC according to an adsorption amount of CMC with respect to the anode active material. Therefore, the anode slurry for a secondary battery according to the present invention may include CMC at 1% by weight or less based on the total weight of the anode slurry. In the present invention, when CMC is included at a content of greater than 1% by weight, it is difficult to achieve a goal of obtaining the anode slurry having a slurry solid content of 48% by weight or more due to a decrease in amount of the anode active material and an increase in amount of distilled water in a CMC solution. As a result, the capacity and output characteristics of the battery may be degraded and migration of lithium ions in an anode may be interrupted, resulting in increased resistance of the anode.

The anode slurry for a secondary battery according to one exemplary embodiment of the present invention is characterized by having a slurry precipitation rate of 7% or less. Here, the slurry precipitation rate is calculated by dividing a height of slurry whose solids precipitate 4 days after preparation of the slurry by an initial height of the slurry. When CMC of the present invention having such an adsorption amount is used, a blend amount of CMC may be reduced to increase a slurry solid content to 48% by weight or more. At the same time, anode slurry having excellent dispersion stability may be prepared, wherein the anode slurry has a slurry precipitation rate of 7% or less. Also, an anode having low resistance may be prepared due to a decrease in the blend amount of CMC.

When the precipitation rate is greater than 7%, slurry precipitation or lack of uniformity in blending ratio in the slurry may occur due to a large change in a slurry phase due to standby time before coating and coating process time after the preparation of the slurry. Meanwhile, a lower limit of the slurry precipitation rate is not particularly limited.

The binder according to one exemplary embodiment of the present invention may include one or more selected from the group consisting of styrene-butadiene rubber (SBR), polyvinylidene fluoride (PVdF), a polyhexafluoropropylene-polyvinylidene fluoride copolymer (PVdF/HFP), poly(vinyl acetate), polyvinyl alcohol, polyethylene oxide, polyvinyl pyrrolidone, alkylated polyethylene oxide, polyvinyl ether, poly(methylmethacrylate), poly(ethylacrylate), polytetrafluoroethylene (PTFE), polyvinyl chloride, polyacrylonitrile, polyvinyl pyridine, an acrylonitrile-butadiene rubber, and an ethylene propylene diene monomer (EPDM). More preferably, the binder may be a styrene-butadiene rubber (SBR).

The styrene-butadiene rubber may have an effect of a binder due to a strong adhesive strength even when used in a small amount. In this case, the styrene-butadiene rubber serving as the binder may be suitably mixed with the aforementioned carboxymethyl cellulose, which has high water solubility and good characteristics as the thickening agent, to prepare an aqueous electrode.

A solvent used to prepare the anode slurry for a secondary battery according to one exemplary embodiment of the present invention is not particularly limited as long as the solvent may be used to properly dissolve CMC. For example, an aqueous solvent may include water or an organic solvent (i.e., a lower alcohol or a lower ketone) that may be uniformly mixed with water, and a non-aqueous solvent may, for example, include N-methyl pyrrolidone (NMP), and the like.

Also, the present invention provides an anode for a secondary battery including the anode slurry for a secondary battery, and a lithium secondary battery including a cathode, an anode, an electrolyte, and a separator, wherein the anode includes the anode slurry for a secondary battery according to the present invention.

The lithium secondary battery of the present invention may be prepared using conventional methods known in the related art. For example, the lithium secondary battery may be prepared by interposing a separator between a cathode and an anode and adding an electrolyte in which a lithium salt is dissolved.

An electrode of the secondary battery may also be prepared using conventional methods known in the related art. For example, the electrode may be prepared by mixing a solvent, a conductive material, a thickening agent, and optionally a binder with a cathode active material or an anode active material, stirring the resulting mixture to prepare slurry, applying (coating) the slurry onto a current collector made of a metal material, and compressing and drying the slurry.

A lithium transition metal oxide may be preferably used as the cathode active material according to one exemplary embodiment of the present invention. For example, the cathode active material may be a mixture of one or more selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, an $a+b+c=1$), $Li_xNi_{1-y}Co_yO_2$ ($0.5<x<1.3$, and $0<y<1$), $LixCo_{1-y}Mn_yO_2$ ($0.5<x<1.3$, and $0<y<1$), $Li_xNi_{1-y}Mn_yO_2$ ($0.5<x<1.3$, and $0\leq y<1$), $Li_x(Ni_aCo_bMn_c)O_4$ ($0.5<x<1.3$, $0<a<2$, $0<b<2$, $0<c<2$, and $a+b+c=2$), $Li_xMn_{2-z}Ni_zO_4$ ($0.5<x<1.3$, and $0<z<2$), $Li_xMn_{2-z}Co_zO_4$ ($0.5<x<1.3$, and $0<z<2$), $Li_xCoPO_4$ ($0.5<x<1.3$), and $Li_xFePO_4$ ($0.5<x<1.3$).

A carbon material, a lithium metal, silicon, or tin, which may occlude and release lithium ions, may be generally used as the anode active material according to one exemplary embodiment of the present invention. Preferably, a carbon material may be used. In this case, all low crystalline carbon and highly crystalline carbon may be used as the carbon material. Representative examples of the low crystalline carbon may include soft carbon and hard carbon, and representative examples of the highly crystalline carbon may include natural graphite, Kish graphite, pyrolytic carbon, mesophase pitch-based carbon fibers, mesocarbon microbeads, mesophase pitches, and high-temperature baked carbons such as petroleum or coal tar pitch derived cokes.

The current collector made of a metal material is a metal that has high conductivity and to which the slurry of the electrode active material may easily attach. Accordingly, any current collector may be used as long as the current collector has no reactivity in a voltage range of the battery. Non-limiting examples of the cathode current collector may include foil formed of aluminum, nickel, or a combination thereof, and non-limiting examples of the anode current collector may include foil formed of copper, gold, nickel, a copper alloy, or a combination thereof.

Any conductive material may be used without particular limitation as long as the conductive material may be generally used in the related art. For example, artificial graphite, natural graphite, carbon black, acetylene black, Ketjen black, Denka black, thermal black, channel black, carbon fiber, metal fiber, aluminum, tin, bismuth, silicon, antimony, nickel, copper, titanium, vanadium, chromium, manganese, iron, cobalt, zinc, molybdenum, tungsten, silver, gold, lanthanum, ruthenium, platinum, iridium, titanium dioxide, polyaniline, polythiophene, polyacetylene, polypyrrole, or a combination thereof may be used as the conductive material. Generally, a carbon black-based conductive material may be often used.

The thickening agent and the binder according to one exemplary embodiment of the present invention are as described above, and thus a description thereof is omitted.

The electrolyte included in the lithium secondary battery according to the present invention may be a mixed organic solvent including one or more selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, and butyl propionate.

Also, the electrolyte according to the present invention may further include a lithium salt, and negative ions of the lithium salt may include one or more selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $F_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The lithium secondary battery according to the present invention may be a cylindrical, prismatic or pouch-type secondary battery. For example, the lithium secondary battery is not limited as long as the lithium secondary battery is a charging/discharging device.

Further, the present invention provides a battery module including the lithium secondary battery as a unit cell, and a battery pack including the same.

The battery pack may be used as a power source for one or more medium and large devices selected from the group consisting of power tools; electric cars including an electric vehicle (EV), a hybrid electric vehicle (HEV), and a plug-in hybrid electric vehicle (PHEV); and power storage systems.

Mode for Invention

Hereinafter, examples of the present invention will be described in detail so that a person having ordinary skill in the art to which the present invention belongs can easily put the present invention into practice. However, it should be understood that the present invention can be implemented in various different forms, and is not limited to the embodiments disclosed below.

Preparative Examples 1 to 6: Measurement of Adsorption Amount of CMC

The following CMC was mixed at a content of 1.5% by weight or more with respect to an anode active material (artificial graphite having a tap density of 0.74 g/cc) to prepare anode active material-CMC slurry. The slurry was diluted 5-fold with distilled water, and CMC which was not adsorbed onto the active material was then filtered. Thereafter, the weight ratio (weight of CMB adsorbed/sum of weights of active material and CMC) of CMB adsorbed onto the active material was measured using a thermogravimetric analyzer (TGA). The results are listed in the following Table 1.

TABLE 1

| | Degree of substitution | Molecular weight | Adsorption amount of CMC |
|---|---|---|---|
| Preparative Example 1 | 0.7 | 730,000 | 0.85 |
| Preparative Example 2 | 0.78 | 3,200,000 (low molecular weight CMC:high molecular weight CMC = 1:3) | 0.85 |
| Preparative Example 3 | 0.73 | 1,800,000 (low molecular weight CMC:high molecular weight CMC = 2:1) | 0.85 |
| Preparative Example 4 | 1.27 | 770,000 | 0.5 |
| Preparative Example 5 | 0.8 | 4,200,000 | 0.81 |
| Preparative Example 6 | 1.1 | 1,400,000 | 0.72 |

Examples: Preparation of Anode Slurry for Secondary Battery and Anodes for Secondary Battery 1) Preparation of Anode Slurry for Secondary Battery An anode active material (artificial graphite having a tap density of 0.74 g/cc), a conductive material (acetylene black), a thickening agent (CMC), and a binder (SBR) were mixed at contents of (96.5-X) % by weight, 1.0% by weight, X %, and 2.5% by weight, respectively, with water to prepare anode slurry.

2) Preparation of Anode for Secondary Battery

The anode slurry was applied onto a copper (Cu) thin film, which was an anode current collector having a thickness of 10 μm, and dried to prepare an anode. Thereafter, the anode was processed using a roll press.

3) Preparation of Lithium Secondary Battery

A cathode active material ($LiNi_{0.6}Mn_{0.2}Co_{0.2}O_2$), a binder (KF1100), and a conductive material (Super-C) were mixed at a weight ratio of 93:4:3 with a solvent (N-methyl-2-pyrrolidone, NMP) to prepare cathode slurry.

The cathode slurry was applied onto one surface of an aluminum (Al) thin film, which was a cathode current collector having a thickness of 20 μm, and dried to prepare a cathode. Thereafter, the cathode was processed using a roll press.

An electrolyte was prepared by dissolving one mole of $LiPF_6$ in a solvent which was obtained by adding vinylene carbonate to a solvent in which ethylene carbonate, diethyl carbonate, and dimethyl carbonate were mixed at a volume ratio of 1:1:2.

The cathode and the anode thus prepared were assembled with a separator according to a conventional method to prepare a battery, and the prepared electrolyte was injected into the battery to finally prepare a lithium secondary battery.

Example 1

A lithium secondary battery was prepared by mixing CMC of Preparative Example 1 at a content of 1.0% by weight during preparation of the anode slurry for a secondary battery.

Example 2

A lithium secondary battery was prepared in the same manner as in Example 1, except that CMC of Preparative Example 2 was mixed at a content of 0.8% by weight to prepare anode slurry.

Example 3

A lithium secondary battery was prepared in the same manner as in Example 1, except that CMC of Preparative Example 3 was mixed at a content of 0.9% by weight to prepare anode slurry.

Comparative Example 1

A lithium secondary battery was prepared in the same manner as in Example 1, except that CMC of Preparative Example 4 was mixed at a content of 1.8% by weight to prepare anode slurry.

Comparative Example 2

A lithium secondary battery was prepared in the same manner as in Example 1, except that CMC of Preparative Example 4 was mixed at a content of 1.4% by weight to prepare anode slurry.

Comparative Example 3

A lithium secondary battery was prepared in the same manner as in Example 1, except that CMC of Preparative Example 5 was mixed at a content of 0.8% by weight to prepare anode slurry.

Comparative Example 4

A lithium secondary battery was prepared in the same manner as in Example 1, except that CMC of Preparative Example 6 was mixed at a content of 1.2% by weight to prepare anode slurry.

Experimental Example 1: Measurement of Slurry Solid Content

Slurry solid contents of the anode slurries for a secondary battery prepared in Examples 1 to 3 and Comparative Examples 1 to 4 were measured. The results are listed in the following Table 2.

Experimental Example 2: Measurement of Slurry Viscosity

Slurry viscosities of the anode slurries for a secondary battery prepared in Examples 1 to 3 and Comparative Examples 1 to 4 were measured. The results are listed in the following Table 2.

A sufficient amount of the slurry was put into a beaker having a diameter of 6 cm or more so that the slurry reached a height of 5 cm or more, and viscosity was measured by rotating at 12 rpm in a spindle (a 63 spindle used in this experiment) in which the maximum measurable viscosity is approximately 10,000 cp using a Brookfield viscometer (DV2T (LV)).

Experimental Example 3: Measurement of Slurry Precipitation Rate

Slurry precipitation rates of the anode slurries for a secondary battery prepared in Examples 1 to 3 and Comparative Examples 1 to 4 were measured. The results are listed in the following Table 2. The slurry precipitation rate was calculated by dividing the height of slurry whose solids precipitated 4 days after preparation of the slurry by the initial height of the slurry.

Experimental Example 4: Measurement of Cell Resistance

Single-layer pouch cells of the lithium secondary batteries prepared in Examples 1 to 3 and Comparative Examples 1 to 4 were manufactured, and the resistances of the pouch cells were measured through an electrochemical evaluation in which an electric current of 2.5 C with respect to the capacity was allowed to flow for 30 seconds in the pouch cells. The results are listed in the following Table 2.

TABLE 2

| | Slurry solid content (% by weight) | Slurry viscosity (cp) | Slurry precipitation rate (%) | Cell resistance (ohm) |
|---|---|---|---|---|
| Example 1 | 51.1 | 2300 | 5.5 | 3.48 |
| Example 2 | 49.9 | 4270 | 1.7 | 3.32 |
| Example 3 | 51.3 | 3110 | 6.7 | 3.35 |
| Comparative Example 1 | 42.9 | 2380 | 5.2 | 3.85 |
| Comparative Example 2 | 47.8 | 1950 | 9.5 | 3.65 |
| Comparative Example 3 | 43.5 | 4650 | 2.8 | 3.36 |
| Comparative Example 4 | 44.9 | 3020 | 3.5 | 3.58 |

As listed in Table 2, it can be seen that the solid content, viscosity, precipitation rate and cell resistance of the slurry varied depending on the degree of substitution and molecular weight of CMC, the CMC adsorption amount, and the slurry blend amount. Specifically, it can be seen that the lithium secondary batteries prepared in Examples 1 to 3 had a slurry solid concentration of 48% by weight or more, which was higher than those of the lithium secondary batteries of Comparative Examples 1 to 4, and had low cell resistance.

Referring to Comparative Examples 1 and 2, it can be seen that CMC had to be blended at a blend amount of 1.0% by weight or more, that is, a blend amount of 1.8% by weight and 1.4% by weight, respectively, in order to secure a stable precipitation rate when the molecular weight and adsorption amount of CMC were lower than those of Examples of the present invention. Also, it can be seen that the use of an excessive blend amount of CMC reduced the slurry solid content to 48% by weight or less, that is, 42.9% by weight and 47.8% by weight for Comparative Examples 1 and 2, respectively. To increase the reduced slurry solid content to 48% by weight or more, a blend amount of CMC had to be reduced. In this case, another problem regarding an increase in precipitation rate due to degraded dispersibility occurred.

Also, referring to Comparative Example 3, the CMC adsorption amount was 0.81% by weight, which was high as in the Examples. However, when CMC had a very high molecular weight of 4,200,000, the slurry had a very high viscosity of 4,650 cp. Therefore, because distilled water had to be additionally added to adjust the viscosity of the slurry, problems regarding a decrease in the slurry solid content were caused.

Referring to Comparative Example 4, it can be seen that the molecular weight of CMC was similar to those of the Examples, but when CMC had a low adsorption amount of 0.72% by weight, the blend amount of CMC had to increase to 1.0% by weight or more, that is, 1.2% by weight in order to secure a stable precipitation rate as in Comparative Examples 1 and 2 in which CMC had a low molecular weight. Also, it can be seen that the use of an excessive blend amount of CMC reduced the slurry solid content to 48% by weight or less, that is, 44.9% by weight.

From the experiments, the dispersibility of the anode active material may be improved to secure a stable precipitation rate, and the appropriate physical properties and blend amount of CMC, which may be used to prepare the anode slurry for a secondary battery having an increased slurry solid content and a reduced battery resistance, may be selected.

Although the present invention presented herein has been disclosed for illustrative purposes, it should be understood to those skilled in the art to which the present invention belongs that various modifications and changes are possible without departing from the scope and spirit of the present invention. Therefore, the exemplary embodiments disclosed above are illustrative in all aspects, but not intended to limit the present invention.

The invention claimed is:

1. An anode slurry for a secondary battery comprising an anode active material and a thickening agent,
   wherein the anode active material has a tap density of 1.0 g/cc or less and a slurry solid content of 48% by weight or more based on the total weight of the slurry,
   wherein the thickening agent is carboxymethyl cellulose (CMC),
   wherein the CMC has a degree of substitution of 0.73 to 0.78,
   wherein the CMC comprises low molecular weight CMC having a weight average molecular weight of 1,000,000 or less and high molecular weight CMC having a weight average molecular weight of 2,000,000 or more,
   the low molecular weight CMC and the high molecular weight CMC are blended in a weight ratio of 1:3 to 3:1, and
   wherein the CMC has a weight average molecular weight of 1,800,000 to 3,200,000.

2. The anode slurry of claim 1, wherein the CMC has an adsorption amount of 0.8 to 0.9% by weight with respect to the anode active material.

3. The anode slurry of claim 1, wherein the CMC is present at a content of 1% by weight, based on the total weight of the anode slurry.

4. The anode slurry of claim 3, wherein a slurry precipitation rate of the anode slurry for a secondary battery is less than or equal to 7%.

5. An anode for a secondary battery formed from the anode slurry for a secondary battery defined in claim 1.

6. A lithium secondary battery comprising a cathode, the anode of claim 5, an electrolyte, and a separator.

\* \* \* \* \*